United States Patent Office 3,632,761
Patented Jan. 4, 1972

3,632,761
METHOD OF OBTAINING ANTIHYPERTENSIVE AND ANTIANXIETY EFFECTS
Boyd E. Graham and William Veldkamp, Kalamazoo, Mich., assignors to The Upjohn Company, Kalamazoo, Mich.
No Drawing. Filed Aug. 8, 1969, Ser. No. 848,707
Int. Cl. A61k 27/00
U.S. Cl. 424—248                        2 Claims

ABSTRACT OF THE DISCLOSURE

The invention provides pharmaceutical dosage unit consisting essentially of an effective amount for antihypertensive and anti-anxiety effects in mammals, for example, humans and valuable warm-blooded animals such dogs, cats and other domestic animals, of the free base and acid addition salt forms of a compound of the formula

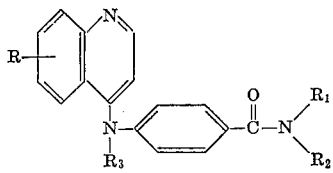

where in R is hydrogen, alkyl having 1 to 4 carbon atoms, inclusive halogen, or alkoxy having 1 to 4 carbon atoms, inclusive; $R_1$ is hydrogen or alkyl having 1 to 4 carbon atoms, inclusive; $R_2$ is hydrogen or alkyl having 1 to 4 carbon atoms, inclusive; $R_1$ and $R_2$ when taken together with —N< is saturated heterocyclic amino radical selected from the group consisting of unsubstituted and mono-alkyl and polyalkyl substituted pyrrolidino, piperidino, hexamethylenimino, morpholino, piperazino, and 4-benzylpiperazino; and $R_3$ is hydrogen or alkyl having 1 to 4 carbon atoms, inclusive. Methods of administration are also provided.

BACKGROUND OF THE INVENTION

Known compounds and compounds prepared conveniently by known methods are utilized as essential active ingredients in the pharmaceutical dosage unit forms of this invention. Methods are available in the chemical literature (e.g., methods described in the references given below) to couple p-aminobenzamides where $R_1$ and $R_2$ are as previously described with a 4 - chloroquinoline (R=hydrogen, halogen, alkyl having 1 to 4 carbon atoms, inclusive, or alkoxy having 1 to 4 carbon atoms, inclusive) in a lower alkanol such as ethanol using as catalyst one equivalent of hydrochloric acid. The p-aminobenzamides are derived from the corresponding p-nitrobenzamides by catalytic hydrogenation; the p-nitrobenzamides are prepared from the corresponding amines or ammonia and p-nitrobenzoyl chloride.

Those compounds depicted in the above general formula wherein $R_3$ is alkyl are prepared by treating a compound where $R_3$ is hydrogen with the corresponding alkyl halide, e.g., methyl iodide or bromide, and an alkali metal hydride or alkali metal amide, e.g., sodium hydride or sodium amide. M. H. Fukami, Amides of 4-Quinolylaminoacids as Chemotherapeutic Agents, University of Michigan, Ph.D. Thesis 1967, pages 19, 25, 26 describes 1 - [p-[(7-chloro-4-quinolyl)amino]benzoyl]benzoyl]-4-methylpiperazine, otherwise p - [(7 - chloro-4-quinolyl) amino] - N,N - (3-methyl-3-azapentamethylene)benzamide and its meta isomer. Slight activity against Schistosoma mansoni cercariae in mice and against Plasmodium berghei at a dose of 160 mg./kg. subcutaneously to mice are disclosed.

Examples of alkyl of from 1 to 4 carbon atoms, inclusive, are methyl, ethyl, propyl, butyl and isomeric forms thereof.

Examples of alkoxy of from 1 to 4 carbon atoms, inclusive, are methoxy, ethoxy, propoxy, butoxy and isomeric forms thereof.

Examples of halogen are fluorine, chlorine and bromine.

Examples of saturated heterocyclic amino radicals, in addition to those already named, are 2-2,-dimethylpyrrolidino, 2-ethyl-pyrrolidino, 2-isopropylpyrrolidino, 2-sec. butylpyrrolidino, 2-methylpiperidino, 3-methylpiperidino, 4-methylpiperidino, 2-butylpiperidino, 3,4-diethylpiperidino, 2-methylhexamethylenimino, 3,6-dimethylhexamethylenimino, 2,2-dibutylhexamethylenimino, 2-ethylmorpholino, 3,3 - dimethylmorpholino, 2 - ethyl-5-methylmorpholino, 4 - methylpiperazino, 2 - methyl - 4-benzylpiperazino, 4-butylpiperazino and the like.

The p-(4-quinolylamino)benzamides of Formula I in which $R_3$ is hydrogen can be prepared by reacting a 4-chloroquinoline having the formula

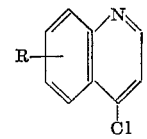

wherein R is as defined above, with a p-animobenzamide having the formula

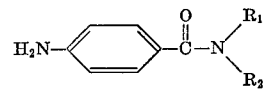

wherein $R_1$ and $R_2$ are as defined above. The reaction is carried out in accordance with methods known in the art for reacting 4-chloroquinolines with amines, for example, as disclosed in J. Amer. Chem. Soc. 66, 1127 (1944); ibid. 70, 1363 (1948); and J. Chem. Soc. 1014 (1949). Advantageously, the Formula II 4-chloroquinoline and the Formula III p-aminobenzamide are reacted in equimolar amounts in the presence of an inert reaction medium, e.g., a lower alkanol such as ethanol, and a catalyst, e.g., an equimolar amount of hydrogen chloride introduced into the reaction mixture in the form of concentrated hydrochloric acid.

The p-(4-quinolylamino)benzamides of Formula I in which $R_3$ is alkyl can be prepared by alkylating compounds of Formula I in which $R_3$ is hydrogen. For example, a Formula I compound in which $R_3$ is hydrogen can be treated first with an alkali metal hydride or amide, e.g., sodium amide or sodium hydride, and then with an alkyl halide, the reaction being carried out in the presence of an inert reaction medium, e.g., toluene or xylene.

The 4-chloroquinolines of Formula II and p-aminobenzamides of Formula III, many of which are known, can be prepared by known procedures.

The synthesis of representative compounds of Formula I is shown in the preparations.

Acid addition salts can be prepared by reacting a Formula I free base with a stoichiometric amount of an acid, such as hydrogen chloride, hydrogen bromide, hydrogen iodide, sulfuric acid, phosphoric acid, acetic acid, lactic acid, citric acid, succinic acid, benzoic acid, salicylic acid, pamoic acid, cylohexanesulfamic acid, and the like. The reaction can be carried out in aqueous or non-aqueous media such as ether, ethyl acetate, and the like.

PREPARATION 1

*p-[(7-chloro-4-quinolyl)amino]N,N-(3-methyl-3-azaphentamethylene)-benzamide*

A solution of 54.8 gm. of 4-methyl-1-(p-aminobenzoyl)piperazine and 49.5 gm. of 4,7-dichloroquinoline in 1250 ml. of absolute ethanol is treated with 21 ml. of concentrated hydrochloric acid, and the mixture is heated at reflux for 19 hours and is then evaporated to dryness under reduced pressure. The resulting solid is shaken with 375 ml. of 2 N sodium hydroxide. The aqueous phase is removed by decantation. The residue is washed with three 250-ml. portions of water and rcrystallized from ethanol, thus obtaining 72.2 gm. of p - [(7-chloro-4-quinolyl)amino] - N,N - (3 - methyl-3-azaphentamethylene)-benzamide, melting point 220.5–222° C.

*Analysis.*—Calcd. for $C_{21}H_{21}ClN_4O$ (percent): C, 66.22; H, 5.56; Cl, 9.31; N, 14.72. Found (percent): C, 66.19; H, 5.37; Cl, 9.39; N, 14.31.

Following the same procedure, but replacing 4-methyl-1-(p-aminobenzoyl)piperazine with other p-aminobenzamides of Formula III, there are prepared other p-(4-quinolylamino)benzamides of Formula I, such as:

p-[(7-chloro-4-quinolyl)amino]-N,N-(1,1-dimethylene)benzamide
p-[(7-chloro-4-quinolyl)amino]-N,N-(1,1-dimethyltetramethylene)benzamide;
p-[(7-chloro-4-quinolyl)amino]-N,N-(1-isopropyltetramethylene)benzamide;
p-[(7-chloro-4-quinolyl)amino]-N,N-(3-methylpentamethylene)benzamide;
p-[(7-chloro-4-quinolyl)amino]-N,N-(1-butylpentamethylene)benzamide;
p-[(7-chloro-4-quinolyl)amino]-N,N-(2,3-diethylpentamethylene)benzamide;
p-[(7-chloro-4-quinolyl)amino]-N,N-hexamethylenebenzamide;
p-[(7-chloro-4-quinolyl)amino]-N,N-(1-methylhexamethylene)benzamide;
p-[(7-chloro-4-quinolyl)amino]-N,N-(1-methyl-4-ethyl-3-oxapentamethylene)benzamide;
p-[(7-chloro-4-quinolyl)amino]-N,N-(3-butyl-3-azapentamethylene)benzamide;
p-[(7-chloro-4-quinolyl)amino]-N,N-(3-benzyl-3-azapentamethylene)benzamide, melting point 241–242° C.; and
p-[(7-chloro-4-quinolyl)amino]-N,N-(3-azapentamethylene)benzamide, melting point 248.5–250° C.

PREPARATION 2

*p-[(6-methoxy-4-quinolyl)amino]-N,N-(3-methyl-3-azapentamethylene)benzamide*

Following the procedure of Preparation 1, but substituting 4-chloro-6-methoxyquinoline for 4,7-dichloroquinoline, there is obtained p-[(6-methoxy-4-quinolyl)amino]-N,N-(3-methyl-3-azapentamethylene)benzamide which has a melting point of 212–213° C. after crystallization from a mixture of petroleum ether (boiling range 30–60° C.) and benzene.

PREPARATION 3

*p-[(7-chloro-4-quinolyl)amino]-N,N-pentamethylenebenzamide hydrochloride*

A mixture of 40.85 gm. (0.2 mole) of 1-(p-aminobenzoyl)-piperidine, 39.6 gm. (0.2 mole) of 4,7-dichloroquinoline, 16 ml. of concentrated hydrochloric acid and 1 liter of absolute ethanol is heated at reflux for 17.5 hours. The mixture is evaporated to dryness under reduced pressure and the residue is recrystallized from absolute ethanol. There is thus obtained 58.7 gm. of p-[(7-chloro-4-quinolyl)amino] - N,N - pentamethylenebenzamide hydrochloride, melting point >280° (dec.).

*Analysis.*—Calcd. for $C_{21}H_{22}ClN_3O \cdot HCl$ (percent): C, 62.69; H, 5.26; Cl, 17.62; N, 10.44. Found (percent): C, 62.49; H, 5.23; Cl, 17.68; N, 10.17.

Following the same procedure, but replacing 4,7-dichloroquinoline with other 4-chloroquinolines of Formula II, there are prepared other p-(4-quinolylamino)benzamides of Formula I, such as:

p-[(8-fluoro-4-quinolyl)amino]-N,N-pentamethylenebenzamide;
p-[(5-isobutoxy-4-quinolyl)amino]-N,N-pentamethylenebenzamide;
p-[(7-methyl-4-quinolyl)amino]-N,N-pentamethylenebenzamide; and
p-[(6-isopropyl-4-quinolyl)amino]-N,N-pentamethylenebenzamide as hydrochlorides.

PREPARATION 4

*p-[(7-chloro-4-quinolyl)amino]-N,N-(3-oxapentamethylene)benzamide hydrochloride*

A mixture of 20.62 gm. (0.1 mole) of 4-(p-aminobenzoyl)-morpholine, 19.8 gm. (0.1 mole) of 4,7-dichloroquinoline, 8 ml. of concentrated hydrochloric acid and 500 ml. of absolute ethanol is heated at reflux for 48 hours. The mixture is cooled and filtered to obtain 32.0 gm. of p-[(7-chloro - 4- quinolyl) - amino]-N,N-(3-oxapentamethylene)benzamide hydrochloride, melting point 317–318° C. (dec.).

*Analysis.*—Calcd. for $C_{20}H_{18}ClN_3O_2 \cdot HCl$ (percent): C, 59.41; H, 4.74; Cl, 17.54; N, 10.39. Found (percent): C, 59.35; H, 4.55; Cl, 17.54; N, 10.44.

PREPARATION 5

*p-[(4-quinolylamino)-N,N-(3-methyl-3-azapentamethylene)benzamide*

A mixture of 6.7 gm. of 4-methyl-1-(p-aminobenzoyl)piperazine, 5.0 gm. of 4-chloroquinoline, 6 ml. of concentrated hydrochloric acid and 100 ml. of absolute ethanol is heated at reflux for 20 hours and then evaporated to dryness. The residue is mixed with 100 ml. of 1 N sodium hydroxide and the aqueous mixture is extracted with chloroform. The extract is washed with saturated sodium chloride solution, dried with anhydrous sodium sulfate, and evaporated to dryness. The residue is recrystallized first from ethanol and then from acetonitrile. The product so obtained is chromatographed on 500 mg. of silica gel, using chloroform-methanol (1:1 by volume) as eluant. Fractions shown by thin layer chromatography to contatin the desired product are pooled and evaporated to dryness. The resulting solid is recrystallized from acetonitrile to obtain 1.5 gm. of p-(4-quinolylamino)-N,N-(3-methyl-3-azapentamethylene)benzamide, melting point 220.5–222° C.

*Analysis.*—Calcd. for $C_{21}H_{22}N_4O$ (percent): C, 72.80; H, 6.40; N, 16.17. Found (percent): C, 72.75; H, 6.47; N, 16.15.

PREPARATION 6

*p-[(7-chloro-4-quinolyl)amino]-N-methylbenzamide hydrochloride*

A mixture of 17.9 gm. (0.119 mole) of N-methyl-p-aminobenzamide, 23.5 gm. (0.119 mole) of 4,7-dichloroquinoline, 10 ml. of concentrated hydrochloric acid and 500 ml. of absolute ethanol is stirred at about 25° C. for 20 minutes. A precipitate begins to form, and the mixture is then heated at reflux for 4 hours. The mixture is cooled and filtered to obtain 36.4 gm. of p-[(7-chloro-4-quinolyl)amino]-N-methylbenzamide hydrochloride, melting point 338–339.5° C. (dec.).

*Analysis.*—Calcd. for $C_{17}H_{14}ClN_3O \cdot HCl$ (percent): C, 58.63; H, 4.34; Cl, 20.37; N, 12.07. Found (percent): C, 58.12; H, 4.39; Cl, 21.44; N, 11.78.

Following the same procedure, but employing N-sec. butyl-p-aminobenzamide and 7-bromo-4-chloroquinoline as reactants, p-[(7-bromo-4-quinolyl)amino]-N-sec.butyl-benzamide hydrochloride is obtained.

Following the same procedure, but substituting p-aminobenzamide for N-methyl-p-aminobenzamide, p[(7-chloro-4-quinolyl)amino]benzamide hydrochloride is obtained.

PREPARATION 7 p-[(7-chloro-4-quinolyl)amino]-N,N-dimethylbenzamide

A mixture of 16.4 gm. (0.10 mole) of N,N-dimethyl-p-aminobenzamide, 18.8 gm. (0.10 mole) of 4,7-dichloroquinoline, 8 ml. of concentrated hydrochloric acid and 500 ml. of absolute ethanol is heated at reflux for 19 hours, after which 100 ml. of 2.5 N sodium hydroxide is added. The mixture is cooled and filtered and the filter cake is recrystallized from methanol. There is thus obtained 16.2 gm. of p[(7-chloro-4-quinolyl)amino]-N,N-dimethylbenzamide, melting point 258.5–259.5° C.

*Analysis.*—Calcd. for $C_{18}H_{16}ClN_3O$ (percent): C, 66.36; H, 4.95; N, 12.90. Found (percent): C, 66.13; H, 5.40; N, 12.89.

PREPARATION 8 p-[(7-chloro-4-quinolyl)-N-ethylamino]-N,N-(3-methyl-3-azapentamethylene)benzamide A mixture consisting of 3.80 gm. (0.01 mole) of p-[(7-chloro - 4 - quinolyl)amino] - N,N - (3 - methyl - 3 - azapentamethylene)-benzamide, 0.01 mole of sodium hydride (as a 56% suspension in mineral oil) and 150 ml. of toluene is heated at reflux for 30 minutes. Ethyl iodide (3.12 gm.; 0.02 mole) is added to the mixture and refluxing is continued for 3 hours, at which time the mixture is evaporated to dryness under reduced pressure. The residue is extracted with methylene chloride. Evaporation of the extract gives p-[(7-chloro-4-quinolyl)-N-ethylamino]-N,N-(3-methyl-3-azapentamethylene)benzamide.

By substituting methyl iodide and butyl iodide, respectively, for ethyl iodide, the corresponding N-methylamino and N-butylamino compounds are obtained.

SUMMARY OF THE INVENTION

This invention relates to pharmaceutical dosage unit forms for systemic administration (oral and parenteral administration) in obtaining unexpectedly advantageous beneficial results in hypertensive and anxiety conditions in mammals including humans and valuable warm-blooded animals such as dogs, cats, and other domestic animals. The term "dosage unit form" as used in this specification and in the claims refers to physically discrete units suitable as unitary dosages for mammalian subjects, each unit containing a predetermined quantity of the essential active ingredient calculated to produce the desired effect in combination with the required pharmaceutical means which adapt the said ingredient for systemic administration. The specifications for the novel dosage unit forms of this invention are dictated by and directly dependent on the unique characteristics of the essential active ingredient and the particular effect to be achieved in view of the limitations inherent in the art of compounding such an essential active material for beneficial effects in humans and animals as disclosed in detail in this specification under preferred embodiments, these being features of the present invention. Examples of suitable dosage unit forms in accordance with this invention are tablets, capsules, orally administered liquid preparations in suitable liquid vehicles, sterile preparations in various vehicles, e.g., sterile preparations in suitable liquid vehicles for intramuscular and intravenous administration, suppositories, and sterile dry preparations for the extemporaneous praparation of sterile injectable preparations in a suitable liquid vehicle. Suitable solid diluents or carriers for the solid oral pharmaceutical dosage unit forms are selected from the group consisting of lipids, carbohydrates, proteins and mineral solids, for example, starch, sucrose, kaolin, dicalcium phosphate, gelatin, acacia, corn syrup, corn starch, talc and the like. Capsules both hard and soft are formulated with suitable diluents and excipients, for example edible oils, talc, calcium carbonate and the like and also calcium stearate. Liquid preparations for oral administration are prepared in water or aqueous solutions which advantageously contain suspending agents, for example, sodium carboxymethylcellulose, methylcellulose, acacia, polyvinyl pyrrolidone, polyvinyl alcohol and the like. In the case of injectable forms, they must be sterile and must be fluid to the extent that easy syringeability exists. Such preparations must be stable under the conditions of manufacture and storage, and ordinarily contain in addition to the basic solvent or suspending liquid, preservatives in the nature of bactericidal and fungicidal agents, for example parabens, chlorobutanol, benzyl alcohol, phenol, thimerosal and the like. In many cases it is preferable to include isotonic agents, for example, sugars or sodium chloride. Carriers and vehicles include vegetable oils, ethanol, polyols for example glycerol, propylene glycol, liquid polyethylene glycol and the like. Any solid preparations for subsequent extemporaneous preparation of sterile injectable preparations are sterilized, preferably by exposure to a sterilizing gas, for example ethylene oxide. The aforesaid carriers, vehicles, diluents, excipients, preservatives, isotonic agents and the like, constitute the pharmaceutical means which adapt the preparations for systemic administration.

The pharmaceutical dosage unit forms are prepared in accordance with the preceding general description to provide from about 10 to about 1000 mg. of the essential active ingredient per dosage unit form, which as aforesaid may be in the form of a solid oral preparation, a liquid oral preparation, an injectable preparation including liquid preparations and solid dry preparations for extemporaneous reconstitution to a liquid injectable preparation. The amount of the essential active ingredient provided in the pharmaceutical dosage unit forms is that amount sufficient to obtain antihypertensive and antianxiety effects within the aforesaid effective nontoxic range. Expressed otherwise an amount of the essential active ingredient is provided to a recipient within a range from about 0.1 mg. per kg. to about 15 mg. per kg. of body weight of the recipient.

DESCRIPTION OF THE PREFERRED EMBODIMENT

The following embodiments illustrate the manner and process of making and using the present invention but are not to be construed as limitations of the inventive concept.

In each of the following examples, 1 to 11, inclusive, the essential active ingredient is p-[(7-chloro-4-quinolyl)-amino] - N,N - (3-methyl-3-azapentamethylene)benzamide. For brevity it is listed as "essential active ingredient."

EXAMPLE 1

One thousand tablets for oral use, each containing 250 mg. of essential active ingredient are prepared from the following ingredients:

| | Gm. |
|---|---|
| Essential active ingredient | 250 |
| Dicalcium phosphate | 150 |
| Methylcellulose, U.S.P. (15 cps.) | 6.5 |
| Talc | 20 |
| Calcium stearate | 2.5 |

The essential active ingredient and dicalcium phosphate are mixed well, granulated with 7.5% aqueous solution of methylcellulose, passed through a No. 8 screen and dried carefully. The dried granules are passed through a No. 12 screen, mixed with the talc and stearate and compressed into tablets. These tablets are useful in the treatment of anxiety in adult humans at a dose of 1 tablet 2 or 3 times a day.

EXAMPLE 2

One thousand two-piece hard gelatin capsules for oral use, each capsule containing 10 mg. of essential active ingredient are prepared from the following ingredients:

| | Gm. |
|---|---|
| Essential active ingredient | 10 |
| Lactose, U.S.P. | 100 |
| Starch, U.S.P. | 10 |
| Talc, U.S.P. | 5 |
| Calcium stearate | 1 |

The finely powdered materials are mixed thoroughly, then filled into hard gelatin capsules of appropriate size.

A satisfactory clinical response is obtained in adults showing hypertension with 1 capsule 4 times a day.

EXAMPLE 3

One-piece soft elastic capsules for oral use, each containing 20 mg. of essential active ingredient are prepared in the usual manner by first dispersing the powdered active material in sufficient corn oil to render the material capsulatable.

One capsule 4 times a day is useful in the treatment of moderate hypertension in adult humans.

EXAMPLE 4

An aqueous oral preparation containing in each teaspoonful (5 ml.) 25 mg. of essential active ingredient hydrochloride is prepared from the following ingredients:

| | Gm. |
|---|---|
| Essential active ingredient hydrochloride | 50 |
| Methylparaben, U.S.P. | 7.5 |
| Propylparaben, U.S.P. | 2.5 |
| Saccharin sodium | 12.5 |
| Cyclamate sodium | 2.5 |
| Glycerin, 3000 ml. | |
| Tragacanth powder | 10 |
| Orange oil flavor | 10 |
| F.D. and C. Orange dye | 7.5 |
| Deionized water, q.s. to 10,000 ml. | |

The foregoing aqueous preparation is useful in the treatment of adult agitated depression and anxiety at a dose of 1 teaspoonful 4 times a day.

EXAMPLE 5

One thousand tablets for oral administration, each containing 10 mg. of essential active ingredient and 16.2 mg. of phenobarbital are prepared from the following ingredients:

| | Gm. |
|---|---|
| Essential active ingredient, micronized | 10 |
| Phenobarbital | 16.2 |
| Lactose | 150 |
| Starch | 15 |
| Magnesium stearate | 1.5 |

The ingredients are thoroughly mixed and slugged. The slugs are broken down by forcing through a screen and the resulting granules are then compressed into tablets.

These tablets are useful in tranquilizing excited dogs at a dose of 1 to 3 tablets depending on the weight of the animal and its condition.

EXAMPLE 6

A sterile aqueous suspension suitable for intramuscular injection and containing in each milliliter, 100 mg. of essential active ingredient is prepared from the folowing ingredients:

| | Gm. |
|---|---|
| Essential active ingredient | 10 |
| Polyethylene glycol 4000, U.S.P. | 3 |
| Sodium chloride | 0.9 |
| Polysorbate 80, U.S.P. | 0.4 |
| Sodium metabisulfite | 0.1 |
| Methylparaben U.S.P. | 0.18 |
| Propylparaben, U.S.P. | 0.02 |
| Water for injection, q.s. to 100 ml. | |

The preceding sterile injectable is useful in the treatment of anxiety and apprehension prior to surgery at a dose of 1 to 2 ml.

EXAMPLE 7

One thousand suppositories, each weighing 2.5 gm. and containing 250 mg. of essential active ingredient are prepared from the following ingredients:

| | Gm. |
|---|---|
| Essential active ingredient | 250 |
| Propylene glycol | 165 |
| Polyethylene glycol 4000 q.s., 2500 | |

The essential active ingredient is added to the propylene glycol and the mixture milled until uniformly dispersed. The PEG 4000 is melted and the propylene glycol dispersion added. The suspension is poured into molds and allowed to cool and solidify.

These suppositories are useful in the treatment of post-surgical anxiety at a dose of 1 suppository rectally twice a day.

EXAMPLE 8

One thousand hard gelatin capsules for oral use, each containing 25 mg. of essential active ingredient and 25 mg. of hydrochlorothiazide are prepared from the following ingredients:

| | Gm. |
|---|---|
| Essential active ingredient, micronized | 25 |
| Hydrochlorothiazide | 25 |
| Starch | 125 |
| Talc | 25 |
| Magnesium stearate | 1.5 |

One capsule 4 times a day is useful in the relief of moderate hypertension in adult humans.

EXAMPLE 9

Ten thousand scored tablets for oral use, each containing 25 mg. of essential active ingredient and 0.08 mg. of reserpine, are prepared from the following ingredients and using the procedure of Example 5.

| | Gm. |
|---|---|
| Essential active ingredient, micronized | 250 |
| Reserpine | 0.8 |
| Lactose | 1500 |
| Corn starch | 500 |
| Talc | 500 |
| Calcium stearate | 25 |

This combination of active materials is effective in reducing hypertension in adult humans. The dose is one-half to two tablets 3 times a day depending on the severity of the condition.

EXAMPLE 9a (*Aqueous suspension*)

An aqueous suspension for oral administration is prepared by suspending the essential active ingredient at a concentration of 10 mg./ml. in an aqueous solution containing 1% of sodium carboxymethylcellulose. This suspension is used for bringing about hypotensive effects in unanesthetized normotensive rats. The rats are prepared for measuring blood pressure directly from the aorta through a chronic indwelling cannula [Weeks and Jones, Proc. Soc. Exptl. Biol. and Med., 104, 646 (1960)].

Mean arterial pressure is measured prior to and at four hours and 24 hours after drug administration at a dose of 50 mg./kg. The results in lowering blood pressure are set forth in the table below.

| | Rat No. | Initial B.P., mm. Hg | B.P. change, mm. Hg | |
|---|---|---|---|---|
| | | | 4 hrs. | 24 hrs. |
| Oral dose, mg./kg.: | | | | |
| 50 | 9,269 | 126 | −16 | −20 |
| | 9,271 | 126 | −10 | −10 |
| 50 | 9,287 | 130 | −12 | −30 |
| | 9,320 | 134 | −8 | −24 |
| 50 | 9,329 | 134 | −14 | −14 |
| Average | | 130 | −12 | −20 |

EXAMPLE 9b (*Solid preparation for oral administration*)

The essential active ingredient is suspended in a normal mouse diet to provide a concentration in the diet of from about 0.03% to about 0.3%. Groups of male mice, 18–22 gm. each, are fed a stock diet containing various concentrations of the essential active ingredient. Motor activity is determined after 20 hours on the diet, four groups of two mice from each test group being placed in actophotometers. After a ten minute acclimation period, motor activity is recorded for a ten minute period with the following results:

| Percent concentration in Diet | 24 hour drug intake, mg./kg. | Percent inhibition motor activity |
|---|---|---|
| 0.3 | 122 | −95 |
| 0.1 | 100 | −83 |
| 0.03 | 37 | −74 |

EXAMPLE 10

Ten thousand tablets for oral use, each containing 50 mg. of the essential active ingredient and 25 mg. melitracen, are prepared from the following ingredients and using the procedure of Example 5.

| | Gm. |
|---|---|
| Essential active ingredient, micronized | 500 |
| Melitracen, powdered | 250 |
| Lactose | 1000 |
| Corn starch | 500 |
| Talc | 500 |
| Calcium stearate | 25 |

This tablet is useful in treating adult humans suffering from agitated depression by administering 1 tablet 3 times a day.

EXAMPLE 11

Ten thousand tablets for oral use, each containing 100 mg. of essential active ingredient and 320 mg. acetaminophen, are prepared from the following ingredients and using the procedure of Example 5.

| | Gm. |
|---|---|
| Essential active ingredient, finely powdered | 1000 |
| Acetaminophen, finely powdered | 3200 |
| Corn starch | 500 |
| Talc | 500 |
| Calcium stearate | 50 |

This tablet is useful in treating pain and reducing agitation in an adult patient following surgery by administering one or two tablets 3 times a day depending on the severity of the condition.

EXAMPLE 12

Following the procedure of the preceding Examples 1 to 11, inclusive, dosage forms are similarly prepared by substituting an equivalent amount of the other related compounds or their acid addition salts, such as:

p-[(6-methoxy-4-quinolyl)amino]-N,N-(3-methyl-3-azapentamethylene)benzamide;

p-[(7-chloro-4-quinolyl)amino]-N,N-pentamethylenebenzamide hydrochloride;

p-[(7-chloro-4-quinolyl)amino]-N,N-(3-oxapentamethylene)benzamide hydrochloride;

p-(4-quinolylamino)-N,N-(3-methyl-3-azapentamethylene)benzamide;

p-[(7-chloro-4-quinolyl)amino]-N-methylbenzamide hydrochloride;

p-[(7-chloro-4-quinolyl)amino]-N,N-dimethylbenzamide; and p-[(7-chloro-4-quinolyl)-N-ethylamino]-N,N-(3-methyl-3-azapentamethylene)benzamide.

Although not necessary in the embodiments of the inventive concept, additional active ingredients are incorporated in the present pharmaceutical dosage unit forms as desired. Each pharmaceutical dosage unit form contains therein an amount within the following nontoxic effective ranges: antihypertensive and diuretic agents such as reserpine (0.05 to 1 mg.), hydralazine (10 to 100 mg.), methyldopa (100 to 250 mg.), guanethidine (10 to 50 mg.), hydrochlorothiazide (15–50 mg.) and ethoxzolamide (50 to 150 mg.); tranquilizers, antipsychotic and antianxiety agents such as chlorpromazine (5 to 50 mg.), thioridazine (5 to 100 mg.), haloperidol (0.5 to 5 mg.), meprobamate (100 to 400 mg.), chlorodiazepoxide (5 to 50 mg.), diazepan (2 to 15 mg.) and ectylurea (100 to 300 mg.); barbiturates such as phenobarbital (8 to 60 mg.), butabarbital (8 to 60 mg.) and amobarbital (16 to 120 mg.); analgesics such as aspirin (150 to 600 mg.) and acetaminophen (150 to 600 mg.); and antidepressants such as amitriptyline hydrochloride (10 to 50 mg.), methylphenidate hydrochloride (5 to 20 mg.), d-amphetamine sulfate (2 to 15 mg.), methamphetamine hydrochloride (2 to 15 mg.) and melitracen (15 to 50 mg.).

We claim:

1. A method of producing antihypertensive and anti-anxiety effects in a mammal which consists of administering systemically to the mammal in need of such effects a pharmaceutical dosage unit form supplying an effective nontoxic amount for antihypertensive and anti-anxiety effects of a compound selected from the group consisting of the free base and acid addition salt forms of a compound of the formula

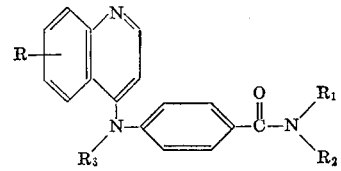

wherein R is hydrogen, alkyl having 1 to 4 carbon atoms, inclusive, halogen or alkoxy having 1 to 4 carbon atoms, inclusive; $R_1$ is hydrogen or alkyl having 1 to 4 carbon atoms, inclusive; $R_2$ is hydrogen or alkyl having 1 to 4 carbon atoms, inclusive, $R_1$ and $R_2$ when taken together with —N< is a saturated heterocyclic amino radical selected from the group consisting of unsubstituted and mono lower alkyl and poly lower alkyl substituted pyrrolidino, piperidino, hexamethylenimino, morpholino, piperazino, and 4-benzylpiperazino; and $R_3$ is hydrogen or alkyl having 1 to 4 carbon atoms, inclusive.

2. A method of producing antihypertensive and anti-anxiety effects in a mammal which consists essentially of administering systemically to the mammal in need of such effects a pharmaceutical dosage unit form supplying an effective nontoxic amount within the range from about 0.1 mg. per kg. to about 15 mg. per kg. of weight of the mammal of a compound selected from the group consisting of the free base and acid addition salt forms of a compound of the formula

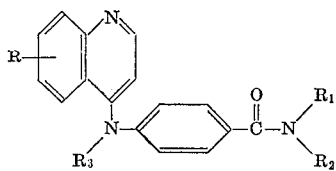

wherein R is hydrogen, alkyl having 1 to 4 carbon atoms, inclusive, halogen or alkoxy having 1 to 4 carbon atoms, inclusive; $R_1$ is hydrogen or alkyl having 1 to 4 carbon atoms, inclusive; $R_2$ is hydrogen or alkyl having 1 to 4 carbon atoms, inclusive; $R_1$ and $R_2$ when taken together with —N< is a saturated heterocyclic amino radical selected from the group consisting of unsubstituted and mono lower alkyl and poly lower alkyl substituted pyrrolidino, piperidino, hexamethylenimino, morpholino, piperazino, and 4-benzylpiperazino; and $R_3$ is hydrogen or alkyl having 1 to 4 carbon atoms, inclusive.

References Cited

Fukami, Amides of 4-Quinolylaminoacids as Chemotherapeutic Agents, University of Michigan, Ph.D. Thesis, 1967, pp. 19, 25 and 26.

JEROME D. GOLDBERG, Primary Examiner

U.S. Cl. X.R.

424—258